United States Patent [19]
Kapusta et al.

[11] Patent Number: 5,799,176
[45] Date of Patent: Aug. 25, 1998

[54] METHOD AND APPARATUS FOR PROVIDING CLOCK SIGNALS TO MACROCELLS OF LOGIC DEVICES

[75] Inventors: Richard L. Kapusta, San Jose; Christopher W. Jones, Pleasanton, both of Calif.

[73] Assignee: Cypress Semiconductor Corp., San Jose, Calif.

[21] Appl. No.: 578,478

[22] Filed: Dec. 26, 1995

[51] Int. Cl.[6] .................................................. G06F 1/10
[52] U.S. Cl. ................................... 395/556; 326/39
[58] Field of Search ......................... 395/556; 326/39, 326/40, 41, 96; 364/488–491

[56] References Cited

U.S. PATENT DOCUMENTS

| | | | |
|---|---|---|---|
| 5,302,866 | 4/1994 | Chiang et al. | 326/40 |
| 5,309,046 | 5/1994 | Steele | 326/39 |
| 5,357,153 | 10/1994 | Chiang et al. | 326/40 |
| 5,550,782 | 8/1996 | Cliff et al. | 326/40 X |
| 5,594,365 | 1/1997 | Agrawal et al. | 326/40 |
| 5,638,008 | 6/1997 | Rangasayee et al. | 326/39 |

*Primary Examiner*—Thomas M. Heckler

*Attorney, Agent, or Firm*—Blakely, Sokoloff, Taylor & Zafman LLP

[57] ABSTRACT

A complex programmable logic device (CPLD) is disclosed which includes a set of logic blocks each containing a product term array and a set of macrocells. A clocking arrangement is provided which allows selection between synchronous and asynchronous clock signals for input to each macrocell. The clocking arrangement is hierarchical. More specifically, a synchronous clock multiplexer is provided, within each logic block, for reducing an input set of N synchronous clock signals, and their complements, to a reduced set of M synchronous clock signals. The selected synchronous clock signals, and J product term asynchronous clock signals, or their complements, provided by the corresponding product term array, are routed into each of the macrocells of the logic block. An additional multiplexer is provided within each macrocell for selecting one clock signal from among the M synchronous clock signals and the J product term signals. The hierarchical clocking arrangement provides considerable flexibility for selecting clocking signals, both on a block by block basis, and on a macrocell by macrocell basis yet requires relatively modest chip resources for implementation. A specific example is described herein where in N is six, M is three and J is one.

16 Claims, 4 Drawing Sheets

METHOD AND APPARATUS FOR PROVIDING CLOCK SIGNALS TO MACROCELLS OF LOGIC DEVICES

BACKGROUND OF THE INVENTION

1. Field of the Invention

The invention generally relates to complex programmable logic devices (CPLDs), or other similar logic devices, and in particular to clocking arrangements for providing clock signals to macrocells within CPLDs, or similar devices.

2. Description of Related Art

CPLDs, and other similar logic devices, such as PLDs, field programmable gate arrays (FPGAs) and programmable application specific integrated circuits (pASICs) are becoming increasingly sophisticated and are providing greater flexibility for users to implement complex systems. State of the art CPLDs, for example, may provide a dozen logic blocks each having a product term array, a product term allocator and sixteen or more macrocells. The product term array and product term allocator are individually programmable and each are capable of processing a fairly large number of product terms. The macrocells provide circuitry for performing logic operations on the product terms received from the product term allocator and circuitry for routing the resulting signals either as combinatorial signals or as registered signals. The logic operations include, for example, summing the product terms or routing the product terms through XOR gates and the like. For registering signals, one or more clocked storage registers is provided within each macrocell and a clocking arrangement is provided for routing clock signals to the registers of the macrocells. The individual logic blocks of the macrocells are interconnected by a programmable interconnect matrix (PIM), or similar devices, capable of routing logical combinations of product terms output by the macrocells of the various logic blocks from one logic block to another such that the overall CPLD is capable of performing sophisticated calculations.

The overall flexibility and effectiveness of a CPLD may be affected by the particular clocking arrangement employed for providing individual clock signals to the various macrocells of the logic blocks. Two broad types of clocking arrangements are typically employed. With a "synchronous" clocking arrangement, clock signals are provided from an external source into the CPLD through one or more clock pins. In one specific example, the 370 family of CPLDs provided by Cypress Semiconductor Corporation (the assignee of rights to the present application), two or four synchronous clock pins are provided. Input synchronous clock signals from the pins, or complement versions thereof, are routed to each of the macrocells of each of the logic blocks. A multiplexer, provided within the macrocell, selects one of the clock signals for use by the particular macrocell. Multiplexer selection bits are routed to each of the macrocells. The clock signal selected by the multiplexer may be used for a variety of purposes within the macrocell including, for example, controlling a latch.

Another broad type of clocking arrangement is "asynchronous" clocking whereby a product term clock is generated by a product term array within each logic block for routing to the various macrocells. The product term clock signal may be generated within the product term array by, for example, an AND expression such as A AND B. With such an expression, the product term clock signal is generated whenever both A and B become set to logic 1. In other words, if A is 1, and B transitions to 1, a product term clock signal is generated on the transition of B to 1. When A is equal to 0, no product term clock signal is generated when B transitions to 1 because the output of the AND term continues to be 0.

Asynchronous clocking allows considerable flexibility in generating clocking signals based upon the result of programmable logic expressions. Asynchronous clocking, however, has the disadvantage of being somewhat slower than synchronous clocking because the asynchronous clock signal is generated only after execution of one or more logic expressions within the product term array. Synchronous clocking has the advantage of being faster, but has generally less flexibility.

One common implementation for asynchronous clocking provides a separate product term clock for each individual macrocell. Although such an asynchronous clocking arrangement provides great flexibility, it does not appear that most practical applications require use of a different product term clock for each macrocell. Accordingly, the added flexibility is unneeded and is merely wasteful of chip resources on the CPLD.

Some CPLDs provide a combination of both synchronous clocking and asynchronous clocking. Such provides even greater flexibility. However, the greater flexibility is achieved only at the expense of consuming greater chip resources.

In general, a trade-off occurs between clocking flexibility and chip resources required to provide the clocking flexibility. Ideally, a clocking arrangement is provided which achieves an optimal trade-off between flexibility and chip resources for most practical applications. Heretofore, however, it does not appear that conventional CPLDs have achieved an optimal trade-off between clocking flexibility and required resources. For example, CPLDs that provide only synchronous clocking lack adequate flexibility. CPLDs that provide only asynchronous clocking lack adequate speed. CPLDs that provide both synchronous and asynchronous clocking often provide too much flexibility which is therefore wasteful of chip resources. Some such CPLDs, for example, provide synchronous clocking signals to each macrocell along with a unique product term clock signal. As noted above, it is believed that the provision of a unique product term clock signal to each separate macrocell is, itself, wasteful of chip resources. In other cases, a relatively large number of synchronous clock signals are connected to each macrocell, requiring considerable chip resources to transmit the clock signals and the selection bits necessary to select between the synchronous clock signals.

The foregoing disadvantages, although described primarily with respect to CPLDs, may also occur within other logic devices having macrocells or similar cells. It would be desirable to provide an improved clocking arrangement for use within CPLDs, and similar devices, which provides both synchronous and asynchronous clocking in a manner which achieves a more effective trade-off between clock flexibility and chip resource usage. The invention is primarily directed to providing such an improved clocking arrangement.

SUMMARY OF THE INVENTION

In accordance with the invention, an improved clocking arrangement is provided for use within a CPLD or similar device wherein the clocking arrangement is a hierarchical arrangement configured to provide substantial clocking flexibility while requiring modest chip resources. In one embodiment, the improved clocking arrangement is provided within a CPLD having a plurality of logic blocks each having a plurality of individual macrocells and at least one product term array. The clocking arrangement provides N synchronous clock signal lines connecting N input clock pins to each of the logic blocks. Within each logic block, an N:M synchronous clock multiplexer reduces the number of synchronous clock signals to M clock signals which are connected to each of the macrocells of the logic block. The clocking arrangement also provides J product term clock lines connected between the product term array and each of the macrocells of the respective logic block. A multiplexer is provided within each macrocell to allow selection of one clock signal from among the J product term clocks and the M synchronous clocks.

In a specific exemplary embodiment, N is six, M is three and J is one such that each macrocell receives three synchronous clock signals and one product term clock signal. Moreover, the synchronous clock signal multiplexer includes an array of inverters for inverting each of the six input synchronous clock signals. The multiplexer then selects three clock signals from the collection of six true and six complement synchronous clock signals. Likewise, a polarity multiplexer is provided along the single product term line such that the individual macrocells may receive either the true or complement of the single product term clock signal.

With this arrangement, a user may select three synchronous clock signals from a total of twelve synchronous clock signals for each logic block. The selection of the three synchronous clock signals may, and likely will, differ from logic block to logic block. Moreover, the user may program a different product term clock for each logic block. Finally, on a macrocell-by-macrocell basis, the user may select one clock signal from among the three previously selected synchronous clock signals and the single product term clock signal. Hence, substantial clocking flexibility is provided. Nevertheless, as a result of the hierarchical clocking arrangement, the total number of input clocks connected into each macrocell is only four, thus requiring only two selection bits to be transmitted to each macrocell. Accordingly, relatively minimal chip resources are required. Thus, an effective trade-off is achieved between clocking flexibility and resource requirements.

For other specific embodiments, N and M may differ with M being generally less than N. For example, N may be eight and M four or N may be four and M two. Also, J may differ from one. For example, J may be two, three or more. However, it is not expected that a large number of product term clock signals need to be employed and, for most applications, only a single product term clock is optimal. The specific arrangement may depend upon such factors as the total number of logic blocks, the number of macrocells per logic block, the number of product terms that can be processed by the overall CPLD, the expected applications that the CPLD may be required to perform, and pin compatibility with other components.

Accordingly, the general objective of the invention set forth above is achieved. Other objects of the invention, as well as other advantages and features of the invention, will be apparent from the drawings and from the detailed description which follows.

DETAILED DESCRIPTION OF EXEMPLARY EMBODIMENTS OF THE INVENTION

With reference to the figures, exemplary embodiments of the invention will now be described. The embodiments are primarily described with reference to block diagrams and schematic diagrams. It should be appreciated that not all components necessary for a complete implementation of the invention are illustrated or described in detail. Rather, only those components necessary for a thorough understanding of the invention are illustrated and described. Furthermore, components which are either conventional or may be readily designed and fabricated in accordance with the teachings provided herein are not described in detail.

Figure 1:
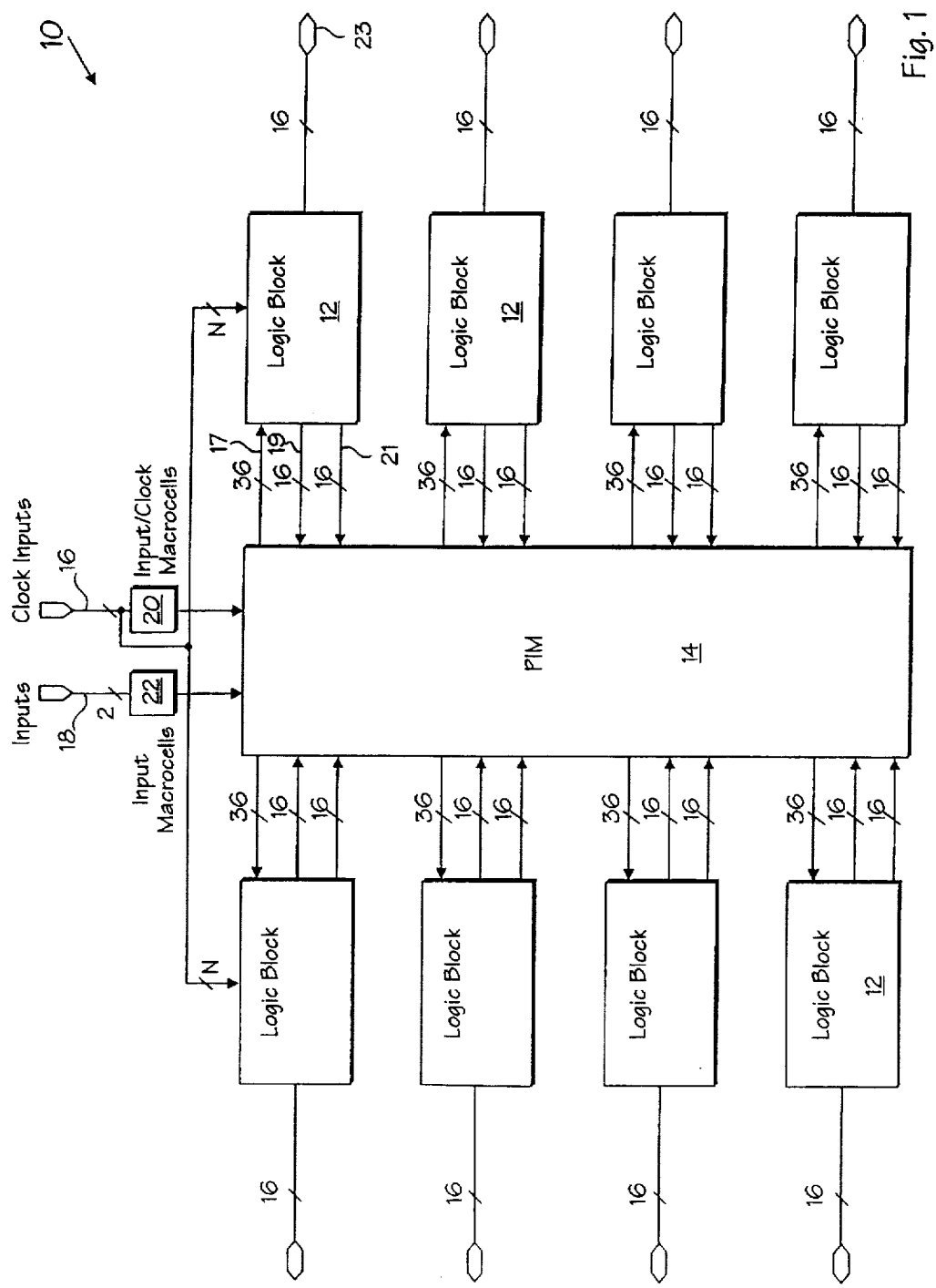
FIG. 1 is a block diagram of an exemplary CPLD configured in accordance with the invention.

FIG. 1 illustrates a CPLD 10 including a plurality of logic blocks 12 each connected to a central PIM 14. Each of the logic blocks 12 includes a set of programmable logic elements which can be programmed, perhaps by flash programming techniques, to perform a variety of product term calculations. Eight such logic blocks are illustrated but, in other embodiments, more or fewer may be employed. CPLD 10 receives synchronous clock signals through clock input 16 and other inputs through input 18. As shown, clock input 16 includes N individual synchronous clock input lines. The N synchronous clock lines are connected to each of individual logic blocks 12. CPLD 10 also includes input/clock macrocells 20 and input macrocells 22 connected to lines 16 and 18, respectively, as shown. These components, and others not separately numbered within FIG. 1, are not pertinent to the invention, may be entirely conventional, and will not be further described.

Each logic block receives signals from the PIM along a single bus 17 and transmits signals to the PIM over two separate buses 19 and 21. In one arrangement, bus 17 has a width of 36 and buses 19 and 21 have widths of 16. Each logic block is also connected to a respective input/output pad 23 by a bus 25. In one arrangement, bus 25 has a width of 16.

Figure 2:
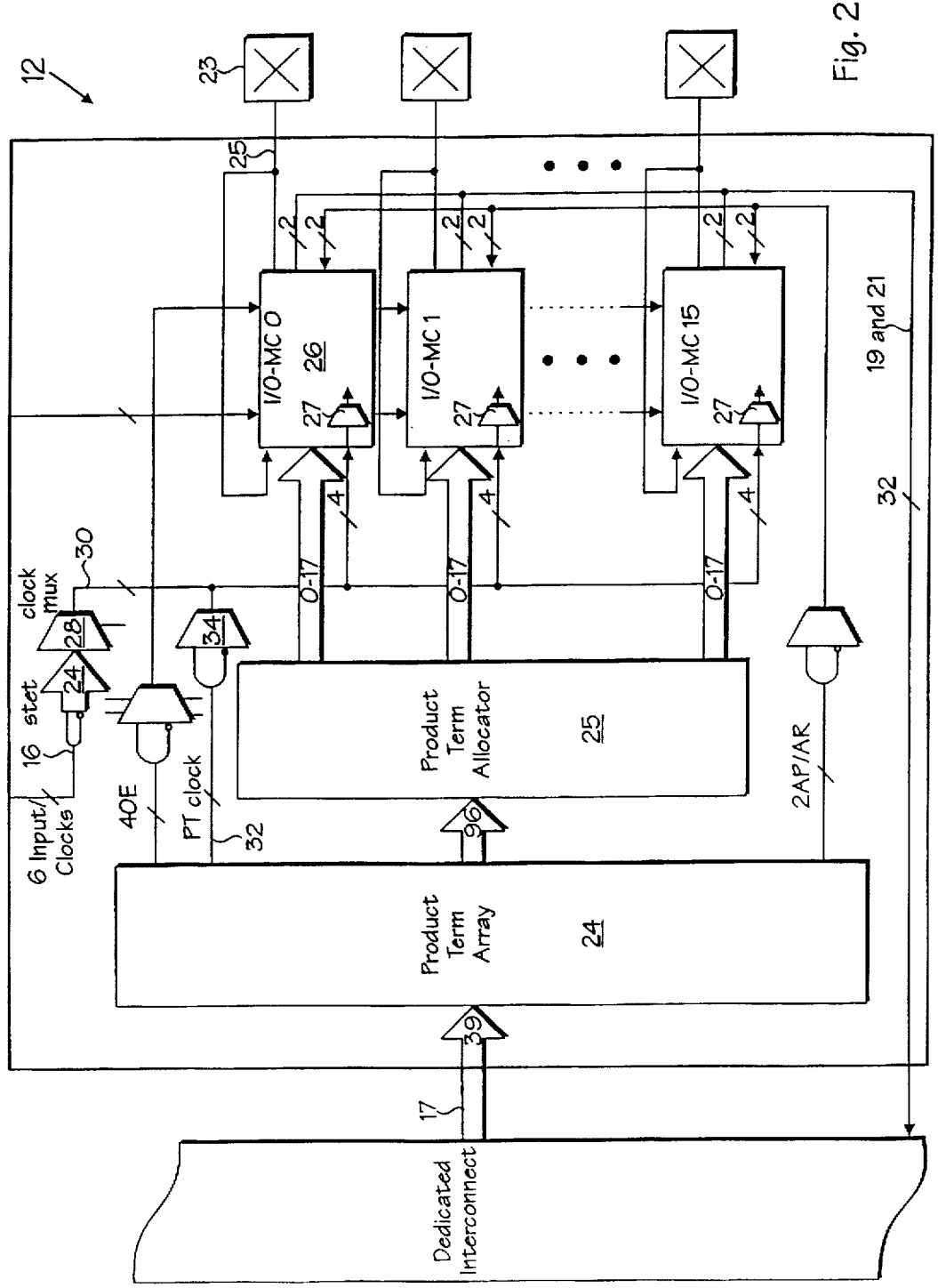
FIG. 2 is a block diagram of a single logic block of the CPLD of FIG. 1.

FIG. 2 illustrates an exemplary one of the logic blocks 12. Logic block 12 includes a product term array 24, a product term allocator 25 and a set of macrocells 26. Sixteen such macrocells are illustrated but, in other embodiments, more or fewer may be employed.

Synchronous clock lines 16 are connected to an N:M synchronous clock multiplexer 28 which generates the inversion or complement of each of the N synchronous clock signals provided along line 16 and selects a total of M clock signals from the N input synchronous clock signals and the N complement clock signals. The M selected clock signals are transmitted along lines 30 into each of macrocells 26.

A single asynchronous product term clock line 32 is connected between product term array 24 and an asynchronous clock multiplexer 34. Multiplexer 34 generates an inversion or complement of the product term clock provided along line 32 and selects either the true or complement product term clock for output along line 30 which, as noted, is connected into each of the macrocells 26. In other arrangements, additional asynchronous product term clock lines may be provided and, in general, J such clock lines may be employed. In such an arrangement, multiplexer 34 may include additional circuitry for selecting a subset of the J product term clock lines. In the examples described herein, it will be assumed that J is equal to one such that only a single product term clock signal is provided.

Accordingly, each macrocell receives M+1 clock signals including M synchronous clock signals and one product term clock signal. Multiplexers 27 within each macrocell select one of the clock signals from among the M+1 clock signals provided along lines 30.

Multiplexers 28 and 34 are controlled by selection bits provided by a programmable selection unit (not separately shown). The selection bits provided to the multiplexers of the logic block illustrated in FIG. 2 may differ from the selection signals provided to other logic blocks within the overall CPLD. In general, each logic block is controlled separately allowing selection of possibly different synchronous clock signals and product term clock signals within the various logic blocks. Likewise, the selection multiplexer within each macrocell is controlled by separate selection bits (also provided by the programmable source not separately shown). Accordingly, each individual macrocell within a logic block may receive different selection bits from the other macrocells of the same logic block. As can be appreciated, depending upon the values of N and M, a wide range of choices of clocking signals are available for each individual macrocell. In one exemplary implementation, N is six and M is three such that each macrocell receives three synchronous clock signals and one product term clock signal. In that embodiment, a total of nine selection bits are provided for controlling multiplexer 28 and two selection bits are provided for controlling each of the multiplexers of the individual macrocells.

The particular choice for the values for N, M and J may depend on a variety of factors including the number of logic blocks, the number of macrocells per logic block, the number of product terms that can be processed by each macrocell, the expected applications that the CPLD may be required to perform, and the environment into which the CPLD may be required to function in, including pin-compatibility with other components. As such, the values for N, M and J may differ greatly among different implementations of CPLDs. In general, however, it is expected that N may typically be in the range from four to ten and M may typically be in the range from two to five. Also, it is expected that J will typically be one. Regardless of the particular choices for N, M and J, each CPLD configured in accordance with the invention has a generally hierarchical clock selection arrangement whereby a relatively large number of input synchronous clock signals and internally generated product term clock signals are reduced, on a logic block by logic block basis, to fewer clock signals for inputting to each macrocell. The synchronous clocks and the product term clock signals received by the macrocells are reduced, on a macrocell-by-macrocell basis, to a single clock signal for clocking each particular macrocell.

Actual selection of particular clock signals for use in clocking each macrocell depends, of course, upon the particular application with which the CPLD is intended to perform including the particular programming of the CPLD. Such selection is performed by the user programming the CPLD. To this end, the user programs the individual selection bits for controlling each of the various multiplexers. Depending upon the implementation, the selection bits may be provided externally through input pins or may be programmed on the CPLD itself. In the latter case, the selection bits may be programmed at a common location within the CPLD, then transmitted to the various individual selection units, or may be separately programmed directly within each logic block. Indeed, rather than transmit selection bits to the multiplexers, each individual multiplexer itself may be programmed.

Figure 3:
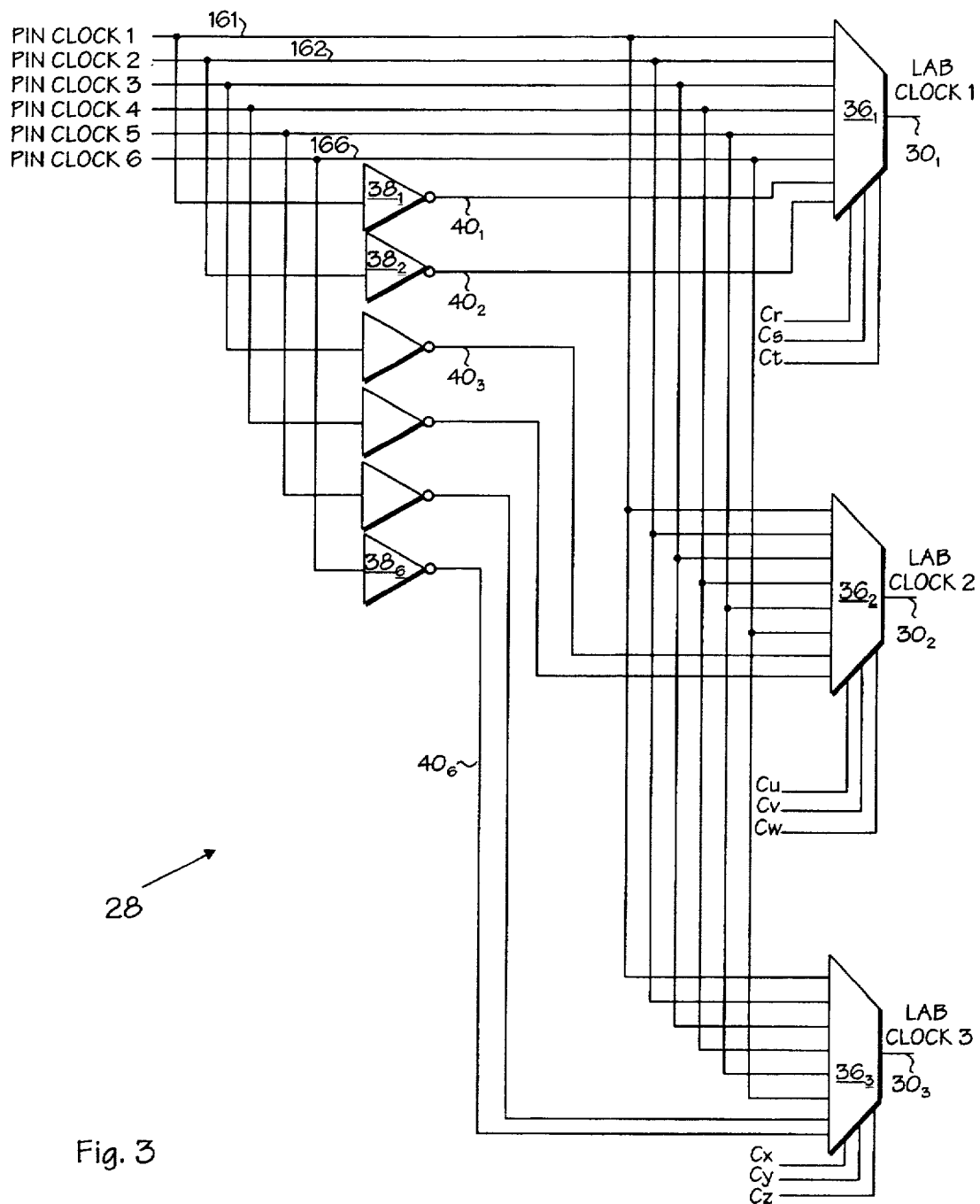
FIG. 3 is a schematic illustration of a synchronous clock selection multiplexer of the logic block of FIG. 2.

FIG. 3 illustrates one possible implementation of synchronous clock multiplexer 28 for an embodiment where N is six and M is three. Multiplexer 28 receives six synchronous clock signals along input lines $16_1$–$16_6$. Each of the six input lines are connected to three 8:1 multiplexers $36_1$, $36_2$ and $36_3$. Multiplexer 28 also includes six inverters $38_1$–$38_6$ receiving the six input synchronous clock signals. Complementary synchronous clock signals are output from inverters $38_1$–$38_6$ along lines $40_1$–$40_6$, respectively. Lines $40_1$ and $40_2$ are connected to multiplexer $36_1$. Lines $40_3$ and $40_4$ are connected to multiplexer $36_2$. Lines $40_5$ and $40_6$ are connected to multiplexer $36_3$.

Hence, each of the three 8:1 multiplexers receives the six input synchronous clock signals and two of the six inverted or complement clock signals. Each of the three multiplexers receive different selection bits allowing a wide range of combinations of the six input synchronous clock signals and the six inverted synchronous clock signals to be output along clock lines $30_1$–$30_3$. For example, the multiplexers may be set to select clock signal 1 (inverted) through multiplexer $36_1$, clock signal 1 (uninverted) through multiplexer $36_2$, and clock signal 6 (uninverted) through multiplexer $36_3$. A wide range of other combinations of clock signals and inverted clock signals are possible as well.

However, it should be noted that, because each of multiplexers $36_1$–$36_3$ receives only two of the inverted clock signals, that not all possible combinations of true and complement signals can be selected. Rather, there is some limitation as to the selection of the complement clock signals. This is a design choice based on the observation that inverted synchronous clock signals are less often employed in practical CPLDs than inverted clock signals. Of course, in other implementations, each of the three multiplexers $36_1$–$36_3$ may be alternatively configured as 12:1 multiplexers to receive all synchronous clock signals and all complements thereof. By providing 8:1 multiplexers, however, fewer selection bits are required and the overall size of multiplexer 28 is reduced. In still other embodiments, more or fewer of multiplexers 36 may be employed to select for more or fewer clock signals. In general, L multiplexers may be provided each receiving P inputs and providing R outputs. Even with the 8:1 multiplexer is illustrated, other combinations of input signals may be provided into each of the multiplexers. For example, each of multiplexers $36_1$–$36_3$ may be configured to receive four synchronous clock signals and four inverted clock signals. As can be appreciated, a wide range of alternative implementations are possible, and no attempt is made herein to itemize or define all possible combinations.

Figure 4:
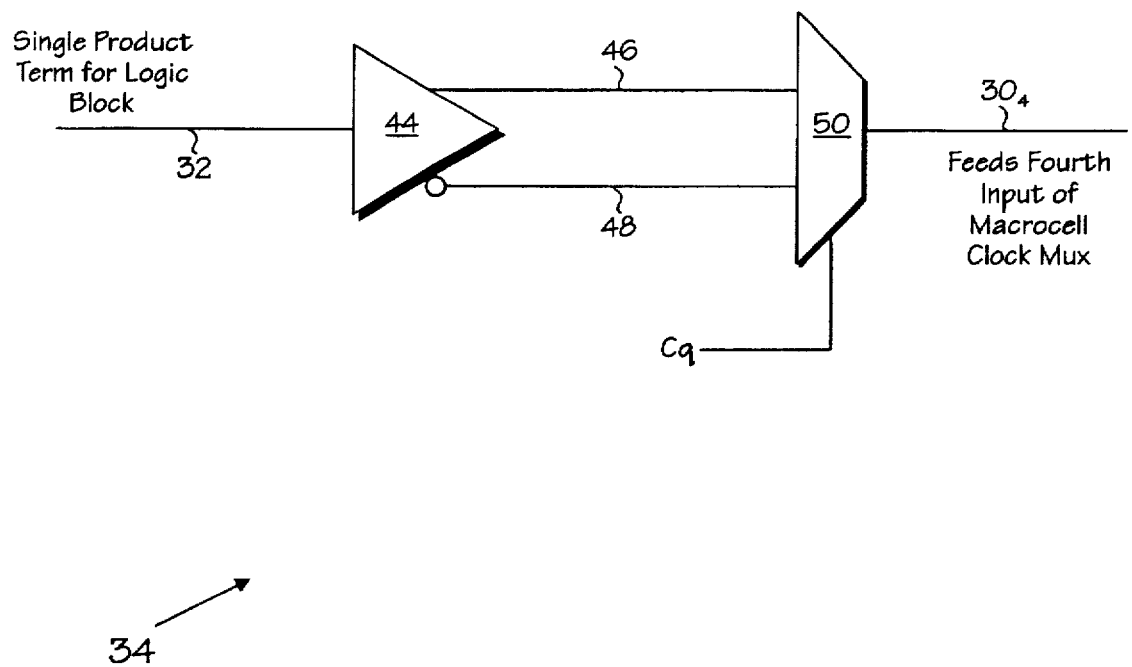
FIG. 4 is a schematic illustration of a product term multiplexer for use with the logic block of FIG. 2.

FIG. 4 illustrates one possible implementation of product term multiplexer 34. Multiplexer 34 includes a buffer 44 which receives a signal from the product term array over signal line 32. Buffer 44 provides both a non-inverted output 46 and an inverted output 48 both of which are, in turn, connected to a 2:1 multiplexer 50. A single bit selection signal is employed to select either the product term clock from line 46 or the complement thereof from line 48 for output along clock line $30_4$. Other implementations of multiplexer 34 are possible. For example, in some implementations, it may be desirable to provide two product term clocks output from the product term array with a correspondingly modified product term multiplexer for selecting only one product term clock signal from the pair of clock signals and their complements. In still other embodiments, it may be desirable to provide more than one product term clock signal to each multiplexer. Although, as noted above, it is believed to be wasteful to provide too many product term docks and one such clock is probably sufficient for most applications. Again, no attempt is made to define or illustrate all possible alternative implementations of the product term multiplexer.

What has been described is a clocking arrangement for use in a CPLD, or similar device, which employs a hierarchical set of multiplexers for reducing a relatively large number of input synchronous clock signals, and their complements, to a smaller number of clock signals for routing to individual macrocells. With this arrangement, an initial selection of a subset of input synchronous clocking signals and their complements is performed on a logic block by logic block basis. A further selection of a single clock signal for each macrocell is performed on a macrocell by macrocell basis. It is believed that the hierarchical clocking arrangement of the invention provides an effective balance between the need for clocking flexibility and the need to minimize the amount of chip recourses required.

An exemplary clocking arrangement has been illustrated and described. This exemplary arrangement is intended to be merely illustrative of the principles of the invention and should not be construed as limiting the scope of the invention. Rather, principles of the invention may be implemented in a wide range of embodiments consistent with the spirit of the invention.

What is claimed is:

1. In a logic device having a plurality of logic blocks each having a plurality of macrocells and a product term array, an improvement comprising:

providing J product term clock signals from each product term array;

providing an N:M multiplexer within each logic block for selecting M synchronous clock signals from N input clock signals; and providing a M+J:1 multiplexer within each macrocell for selecting a single clock signal from said M synchronous clocking signals and from said J product term clock signals.

2. The improvement of claim 1 wherein N is six, M is three and J is one.

3. The improvement of claim 2 wherein the N:M multiplexer comprises:

N inverters coupled to N input synchronous clock signal lines; and

L number of P:R multiplexers, where L×R=M and 2N≧P>R, said L multiplexers each having P inputs coupled to a subset of said N synchronous clock lines and at least one of said N inverters.

4. The improvement of claim 3 wherein N is six, M is three, P is eight, L is three and R is one and wherein:

a first one of said P:R multiplexers has inputs coupled to each of said six synchronous clock signals and to a first pair of said N inverters;

a second one of said P:R multiplexers is coupled to said six synchronous clock signals and is coupled to a second pair of said N inverters; and a third one of said P:R multiplexers is coupled to said six synchronous clock signals and to a third pair of said inverters.

5. The improvement of claim 1 wherein a product term multiplexer is additionally provided, said product term multiplexer selecting said J product term clocks from a larger number of product term clocks.

6. The improvement of claim 1 wherein J is equal to one and wherein an additional product term multiplexer is provided for generating the complement of the J product term clock signal and for selecting either the J product term clock signal or the complement of the J product term clock signal.

7. A logic block for use within a logic device, said logic block comprising:

a product term array providing J product term clock signals;

N input clock lines providing N synchronous input clock signals;

an N:M multiplexer, coupled to said N input clock lines, for selecting M synchronous clock signals from the N input clock signals; and a macrocell receiving said M synchronous clock signals and said J product term clock signals, said macrocell having a M+J:1 multiplexer for selecting a single clock signal for use in clocking the macrocell.

8. The logic block of claim 7 wherein the N:M multiplexer comprises:

N inverters coupled to N input synchronous clock signal lines; and

L number of P:R multiplexers, where L×R=M and 2N≧P>R, said L multiplexers each having P inputs coupled to a subset of said N synchronous clock lines and at least one of said N inverters.

9. The logic block of claim 8 wherein N is six, M is three, P is eight, L is three and R is one and wherein a first one of said P:R multiplexers has inputs coupled to each of said six synchronous clock signals and to a first pair of said N inverters;

a second one of said P:R multiplexers is coupled to said six synchronous clock signals and is coupled to a second pair of said N inverters; and a third one of said P:R multiplexers is coupled to said six synchronous clock signals and to a third pair of said inverters.

10. The logic block of claim 7 wherein N is six, M is three and J is one.

11. The logic block of claim 7, further comprising a plurality of macrocells each receiving said M synchronous clock signals and said J product term clock signals, said macrocells each having a M+J:1 multiplexer for selecting a single clock signal for use in clocking the macrocell.

12. A logic block, having one or more macrocells, for use within a logic device, said logic block comprising:

a unit for providing product terms and J product term clocks;

a unit for receiving N input clock signals;

a unit for selecting M clock signals from said N input clock signals; and a unit, within each respective macrocell, for receiving said M synchronous clock signals and said J product term clock signals and for selecting one clock signal therefrom for use in the respective macrocell.

13. The logic block of claim 12 wherein N is six, M is three and J is one.

14. A method for providing clock signals to a macrocell of a logic block of a logic device, said method comprising the steps of:

receiving N input synchronous clock signals;

selecting M of said N synchronous clock signals;

receiving J product term clock signals;

routing said M synchronous clock signals and said J product term clock signals to said macrocell; and selecting, within said macrocell, one clock signal from among said M synchronous clock signals and said J product term clock signals.

15. The method of claim 14 wherein N is six, M is three and J is one.

16. The method of claim 14, wherein the method provides clock signals to a plurality of macrocells of the logic block of the logic device, and the method further comprises the steps of:

routing said M synchronous clock signals and said J product term clock signals to each of said macrocells; and selecting, within said macrocells, one clock signal from among said M synchronous clock signals and said J product term clock signals.

* * * * *